United States Patent [19]

Bass

[11] Patent Number: 5,499,480

[45] Date of Patent: Mar. 19, 1996

[54] LIGHTWEIGHT METAL TRUSS AND FRAME SYSTEM

[76] Inventor: Kenneth R. Bass, 1728 Eldon Ct., El Cajon, Calif. 92021

[21] Appl. No.: 190,643

[22] Filed: Feb. 2, 1994

Related U.S. Application Data

[63] Continuation-in-part of Ser. No. 82,989, Jun. 25, 1993, which is a continuation-in-part of Ser. No. 40,494, Mar. 31, 1993, abandoned.

[51] Int. Cl.⁶ .................................................. E04H 12/10
[52] U.S. Cl. .................. 52/653.1; 52/653.2; 52/690; 52/696; 52/731.1; 52/731.2; 52/731.7; 52/732.1; 403/232.1; 403/237
[58] Field of Search ................... 403/232.1, 237, 403/230, 208, 206; 52/481.1, 690, 653.1, 653.2, 730.1, 731.1, 731.2, 731.3, 731.4, 731.5, 731.7, 732.3, 731.9, 732.1, 532.1, 532.2, 690, 696

[56] References Cited

U.S. PATENT DOCUMENTS

| | | | |
|---|---|---|---|
| 1,331,247 | 2/1920 | Daniels | 52/731.1 X |
| 1,924,881 | 8/1933 | Ragsdale | 52/731.2 X |
| 2,029,645 | 2/1936 | Waugh . | |
| 2,098,752 | 11/1937 | Miller | 403/237 X |
| 2,167,835 | 8/1939 | Greulich . | |
| 2,457,250 | 12/1948 | Macomber | 52/731.7 X |
| 2,611,160 | 9/1952 | Hanesse | 403/237 |
| 3,129,493 | 4/1964 | Grubb . | |
| 3,221,467 | 12/1965 | Henkels | 52/690 |
| 3,541,749 | 9/1970 | Troutner . | |
| 4,069,638 | 1/1978 | Hasselquist et al. . | |
| 4,168,596 | 9/1979 | Yoder, Jr. . | |
| 4,196,556 | 4/1980 | Russo | 403/230 X |
| 4,253,224 | 3/1981 | Hickman et al. | 403/237 X |
| 4,597,118 | 7/1986 | Mis | 403/232.1 X |
| 5,150,982 | 9/1992 | Gilb | 403/232.1 |

FOREIGN PATENT DOCUMENTS

| | | |
|---|---|---|
| 675888 | 2/1930 | France . |
| 2063545 | 7/1971 | France . |
| 2269618 | 11/1975 | France . |
| 4023902 | 2/1992 | Germany . |
| 8901549 | 2/1989 | WIPO . |
| 9117328 | 11/1991 | WIPO . |

OTHER PUBLICATIONS

Advertising Brochure for "The Carpenter's Steel Stud" Marketed by H. L. Stud Corporation.

Primary Examiner—Carl D. Friedman
Assistant Examiner—Christopher Todd Kent
Attorney, Agent, or Firm—Brown, Martin, Haller & McClain

[57] ABSTRACT

The lightweight metal construction system begins with a beam formed from a single piece of cold formed sheet steel or other sheet metal which is bent lengthwise along four lines to form a triangular cross-section with two wings, side-by-side, extending from its apex. The ends of the beams may be modified to form joints which are used to connect two beams together or to connect the beam to another construction material. Brackets formed from strips of sheet steel or other metal are bent to conform to outer surfaces of the beams or other construction materials are used to attach the beams to other beams or other construction materials. Fasteners are used to firmly attach the joints and brackets to the beams and construction materials.

15 Claims, 6 Drawing Sheets

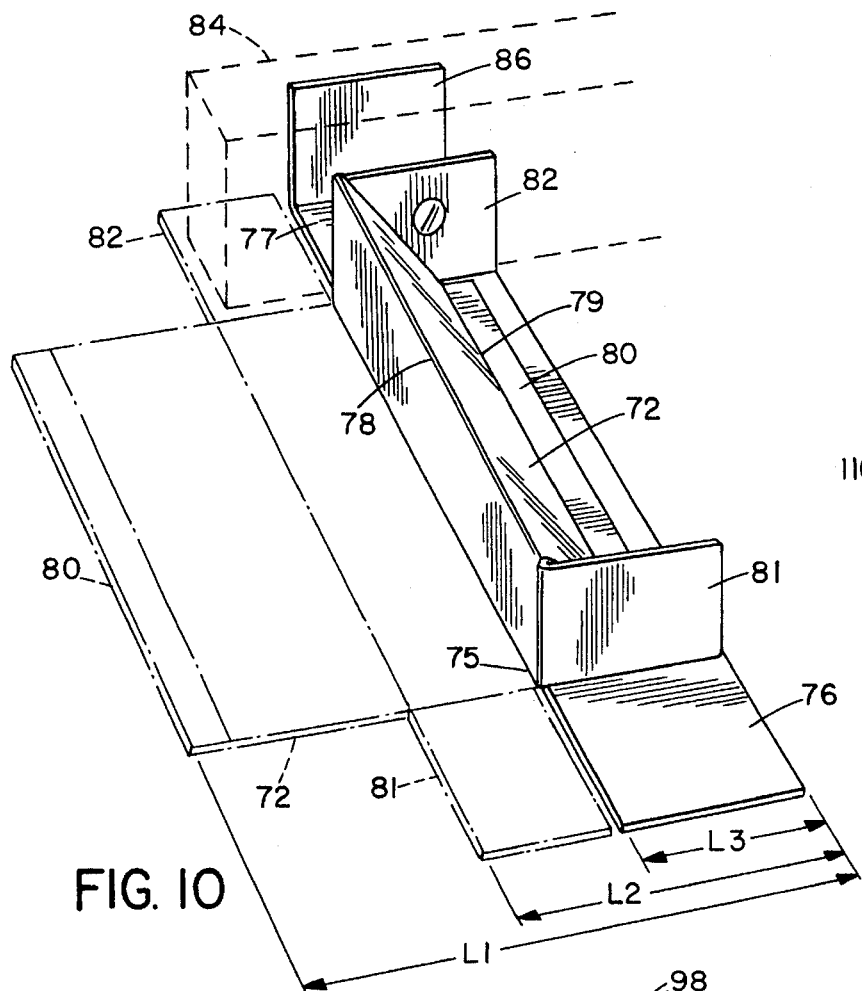
FIG. 10
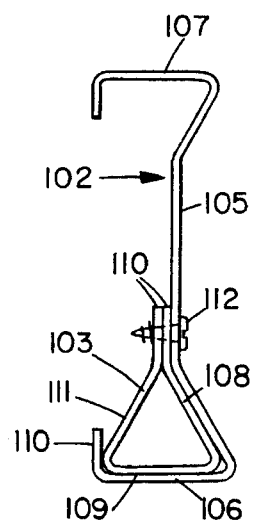
FIG. 12
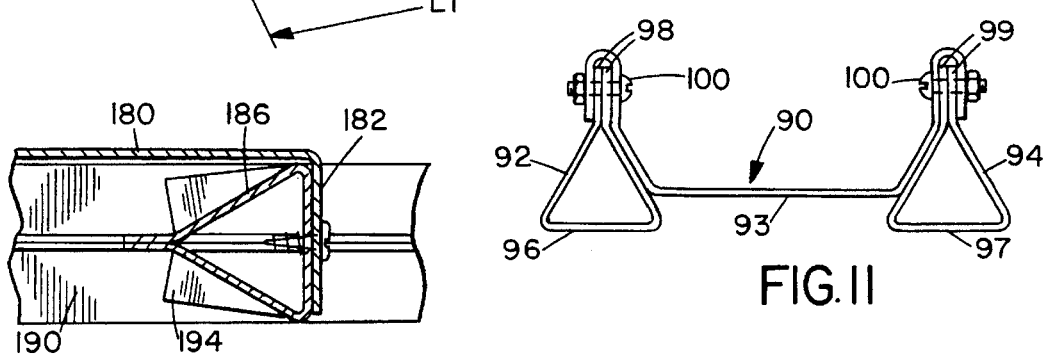
FIG. 11
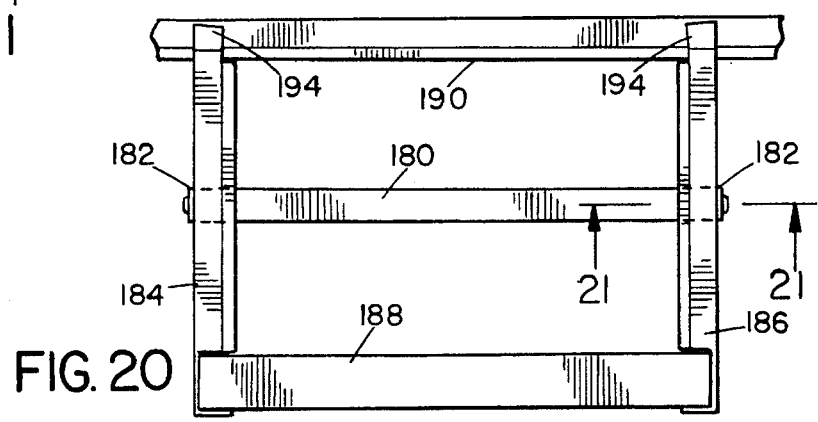
FIG. 21
FIG. 20

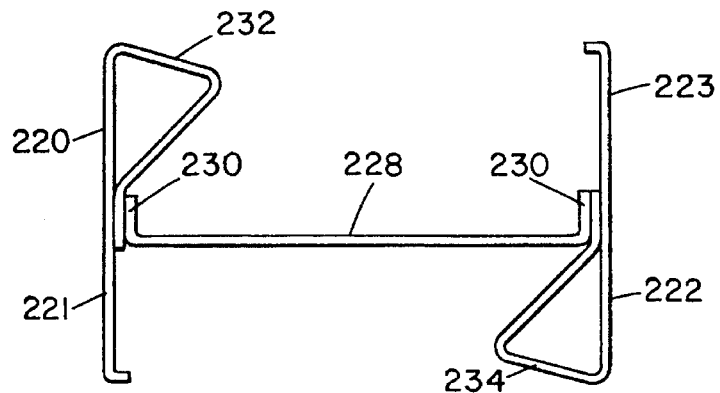
FIG. 25
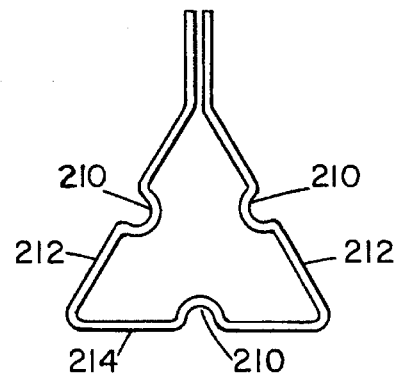
FIG. 24
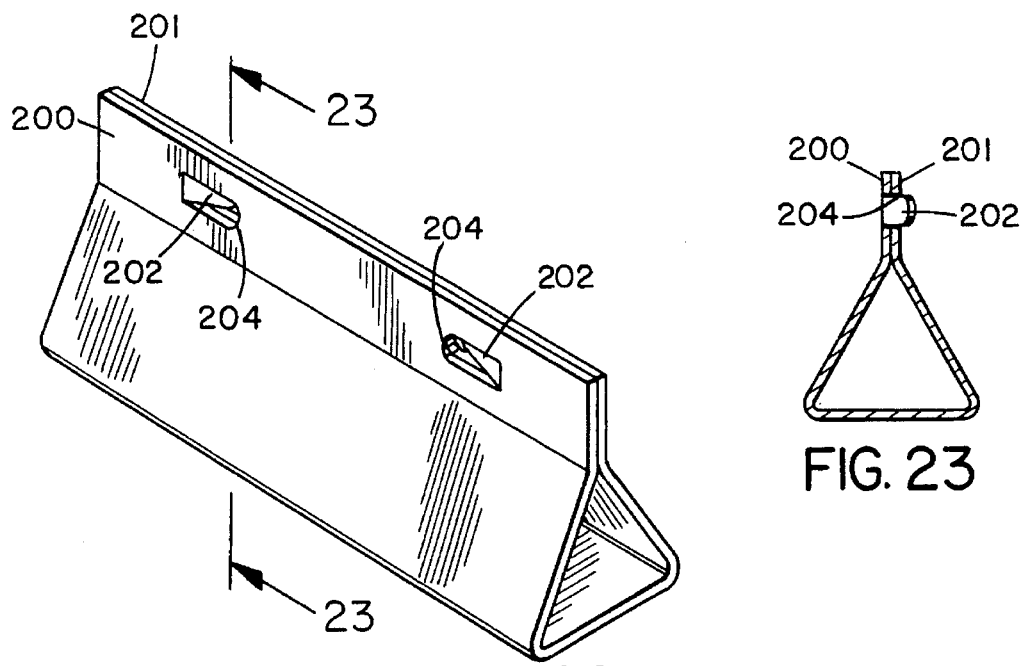
FIG. 22
FIG. 23

LIGHTWEIGHT METAL TRUSS AND FRAME SYSTEM

This is a Continuation-in-Part of application Ser. No. 08/082,989, filed Jun. 25, 1993, which is a Continuation-in-Part of application Ser. No. 08/040,494, filed Mar. 31, 1993 now abandoned.

BACKGROUND OF THE INVENTION

In recent years, the cost of lumber has increased dramatically as the result of limitations placed upon the harvesting of trees in order to preserve the environment. Within the few years alone, the cost of lumber has more than doubled. This cost increase has had a major impact on the cost of new residential construction, making new homes more difficult to build and sell at affordable prices. This, in turn has resulted in the decrease in new housing starts and increased unemployment within the construction industry.

In addition to the increased expenses resulting from the high cost of lumber, there are other reasons that make it desirable to identify a viable alternative to wood for significant portions of the support structure in new construction. These reasons a related to the vulnerability of wood to insect damage and decay, and to the weight of the wood.

Pre-fabricated roof and floor trusses, and frame segments are well known in the residential and light commercial construction industries. The trusses are most commonly formed from two-by-four studs joined together by steel gussets, while the frame segments are often nailed together. The pre-fabricated roof trusses are lifted onto and attached to the top of a structural frame so that the roofing material can be placed on it. The pre-fabricated floor trusses are attached to the foundation or the lower portion of the structural frame so that plywood and flooring can be placed on top and attached thereto. The pre-fabricated components of a structure provide substantial time savings in the construction process, which can be critical when the climate in some areas permits only limited time windows suitable for construction. In general, the time savings result in cost savings. Nonetheless, the significant increase in the cost of lumber had made even these pre-fab trusses and frames so expensive that an alternative is being sought.

A lightweight steel beam has been developed by Navon which is described in PCT Application Publication Number WO 9117328, based upon U.S. patent application Ser. Nos. 07/518,554 (filed May 3, 1990) and 07/674,549 (filed Mar. 22, 1991). This structural beam is an I-beam of four piece construction, where the two bearing portions (top and bottom) have a "C"-shape and the web and flange portion consists of two pieces of sheet steel which are welded at their centers and bent outward to form the triangular flanges. This beam is illustrated in cross-section in FIG. 1, labeled "PRIOR ART". The flanges of the triangles are then welded to the insides of the "C"-shaped bearing portions to create the I-beam. Two beams are joined together by flat or angled gussets which are bolted or welded to the outer surface of the web.

While the Navon beam provides an improvement upon conventional steel beams since it is over 50% lighter and it is relatively easy to use in erecting a structure, it is not trivial to fabricate. Each beam consists of four pieces which must be bent and welded together over the entire length of the beam, making the production process one that requires several specialized pieces of machinery and consumes time. Further, the joints between two beams may be subject to excessive lateral stresses since the gussets merely attach to the outside of the web, without providing any reinforcement of the joint by the beams themselves.

SUMMARY OF THE INVENTION

It is an advantage of the present invention to provide a versatile lightweight steel beam system which may be used in place of wood studs in construction.

It is a further advantage of the present invention to provide a system for fabricating roof, floor and other types of trusses and frames in which the steel beams are easily fitted together in any of a number of different configurations and angles.

Another advantage of the present invention is to provide a versatile lightweight steel beam system as an alternative to both wood and traditional metal construction materials.

In an exemplary embodiment, the system for fabricating roof, floor and other types of trusses and frames begins with a beam formed from a single piece of cold formed sheet steel which is bent lengthwise along four lines to form a triangular cross-section with two wings, side-by-side, extending from its apex. The two wings are not attached together by a separate fastening means, but remain separable until the beam is joined to another beam or other type of construction material. For reinforcement of a long beam, notches may be made in the wings, allowing wing segments to be folded over. To attach one beam to another at any angle, brackets may be used which are constructed in a similar manner as the beams, with triangular cross-sectional inserts or sleeves which fit within or over the beam, depending on the relative dimensions of the bracket's triangle and the beam's triangle. In one embodiment, the brackets have a single triangle with an extended wing providing a gusset which is inserted between the two wings of one of the beams to be attached, and fastened in place by screws, bolts, or other fastening means. The triangular portion of the bracket is inserted into the end of the second beam, or slid over the end, depending on whether the dimensions of the bracket triangle are less than or greater than those of the beam triangle. In another embodiment, the brackets have a triangle formed at two or more edges, to create a single wing extending between the triangles. The triangles are inserted into or slid over the ends of the beams to be joined, then fastened. To connect two beams end-to-end, a telescoping fitting consisting of a triangle with outer dimensions that are slightly smaller than the inner dimensions of the triangle of the beam is used by inserting the telescoping connector into the end of each of the two beams to be connected and driving fasteners through the beams and the telescoping connector. Similarly, a triangle of slightly larger dimensions can be used as a connector by sliding the connector over the ends of the beams to be joined. The assembly procedure, i.e., piecing, sizing, cutting, is the same as that for a standard wood truss or frame, except that angle cuts on the ends of the beams are not required to assemble the steel truss according to the present invention. The cutting of angles at the ends of the beams is eliminated by using brackets with built-in angles. The beams and connectors can also be configured for use as wall studs for framing, door and window headers, and mobile home trusses.

Modifications to the basic beam can be used to create a number of different brackets for interconnecting multiple beams, to attach the beams to wood studs, or to provide means for suspending other beams, studs or sheets of building materials from a support structure constructed from the lightweight metal construction system.

The sheet steel of which the beams and brackets are formed can be selected according to weight requirements for a particular structure, with most common construction applications using material ranging from 24 gauge to 8 gauge steel. Other materials, such as other metals (e.g., aluminum or titanium) or high strength plastics, may be used according to the purpose of the structure. Wallboard or plywood can be nailed or screwed to the base of the triangle, which is comparable in width to the edge of a two-by-four. Wood, plastic or other materials may also be inserted into the beam between the wings, to facilitate attachment of other construction materials. The wings of the beam and the brackets can be pre-drilled so that the fastener need only be inserted through the appropriate holes to achieve the desired connection.

BRIEF DESCRIPTION OF THE DRAWINGS

Understanding of the present invention will be facilitated by consideration of the following detailed description of a preferred embodiment of the present invention, taken in conjunction with the accompanying drawings, in which like reference numerals refer to like parts and in which:

FIG. 10 is a perspective view of an alternative extension for attachment to a wood stud;

FIG. 11 is a side elevation of a bracket joining two beams side-by-side;

FIG. 12 is a side elevation of a bracket for joining two beams one over the other;

FIG. 20 is a diagrammatic view of a frame section;

FIG. 21 is a cross-section taken along line 21—21 of FIG. 20;

FIG. 22 is a perspective view of a length of beam with an alternative reinforcement means;

FIG. 23 is a cross-section taken along line 23—23 of FIG. 22;

FIG. 24 is an end view of a reinforced beam; and

FIG. 25 is an end view of an assembly for replacement of a wood stud.

DESCRIPTION OF THE PREFERRED EMBODIMENT

It should be noted that components of the inventive lightweight metal construction system are described as having tops, bottoms and sides for reference only. These designations are not intended to limit the construction system to use in such an orientation.

Figure 1:
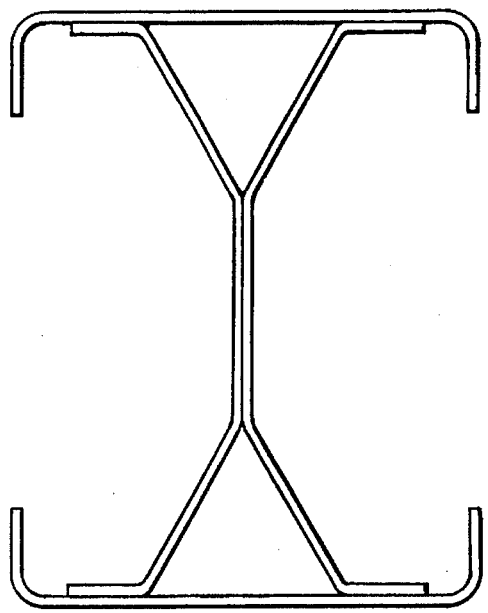
FIG. 1 is an end view of a lightweight steel beam of the prior art.
Figure 2:
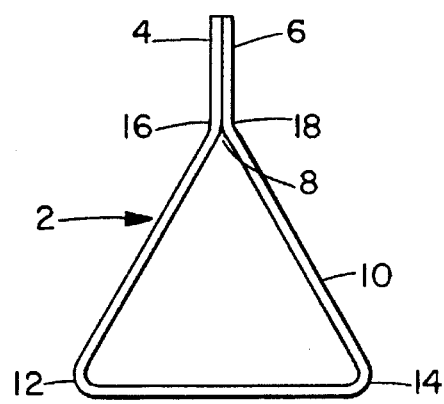
FIG. 2 is an end view of a lightweight steel beam according to the present invention.

As illustrated in FIG. 2, the basic lightweight steel beam 2 is triangular in shape with a pair of wings 4 and 6 extending from the apex 8 of the triangle 10. The triangle 10 is created by bending a sheet of cold formed steel at four places: bottom corners 12 and 14 and shoulders 16 and 18 so that the edges of wings 4 and 6 are generally even. The triangle 10 is symmetrical around a line drawn from the apex 8 perpendicular to the base. The bottom corners 12 and 14 are slightly rounded to avoid weakening the metal at the bends. No welding or other fastening operation is performed on the beam 2, so the wings 4 and 6 are unattached. Holes may be pre-drilled in the beam to facilitate insertion of fasteners for connecting beams together.

Figure 3:
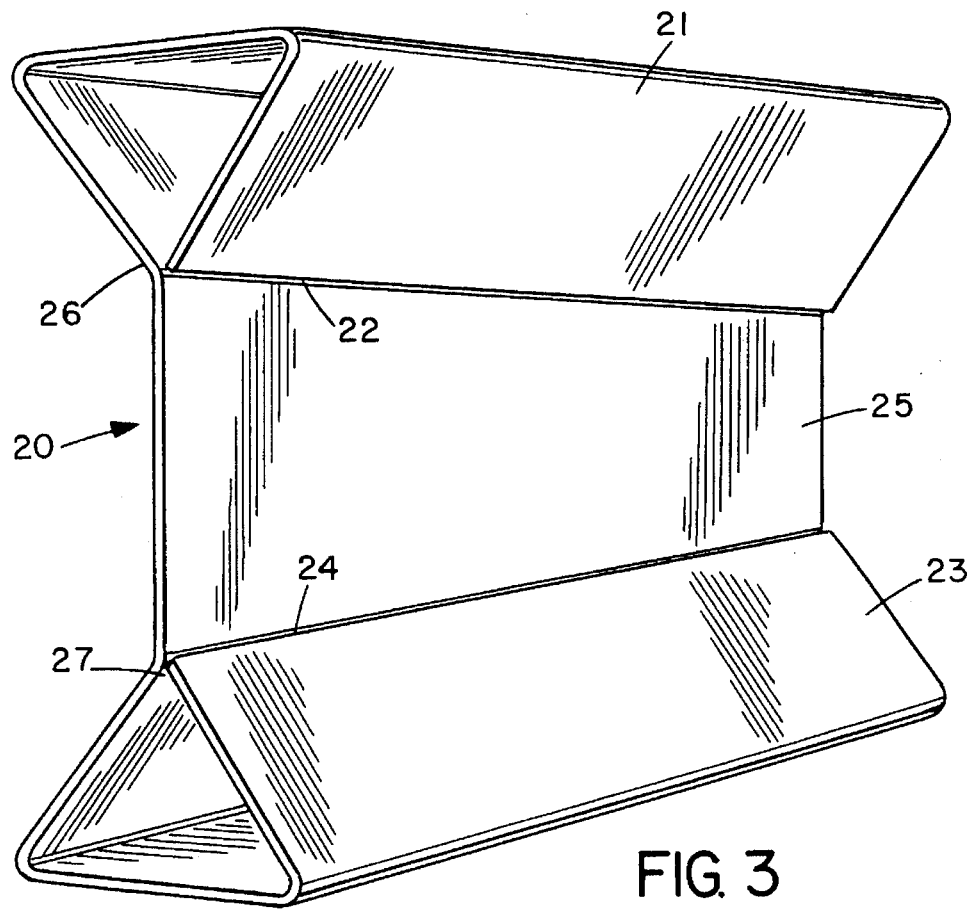
FIG. 3 is a perspective view of a first embodiment of the bracket.
Figure 4:
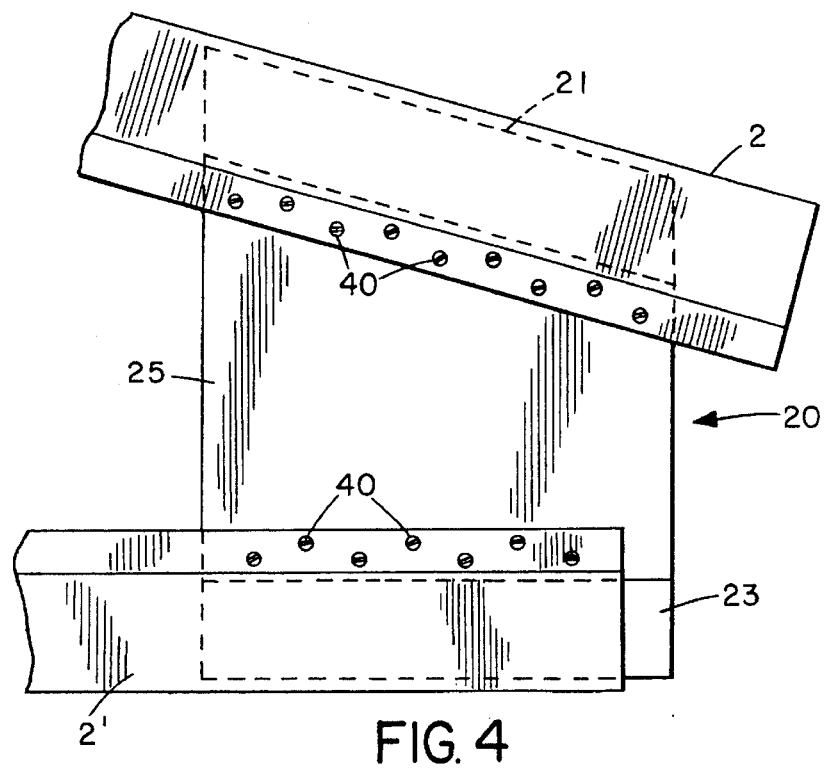
FIG. 4 is a side view of the bracket of FIG. 3 joining two beams.
Figure 5:
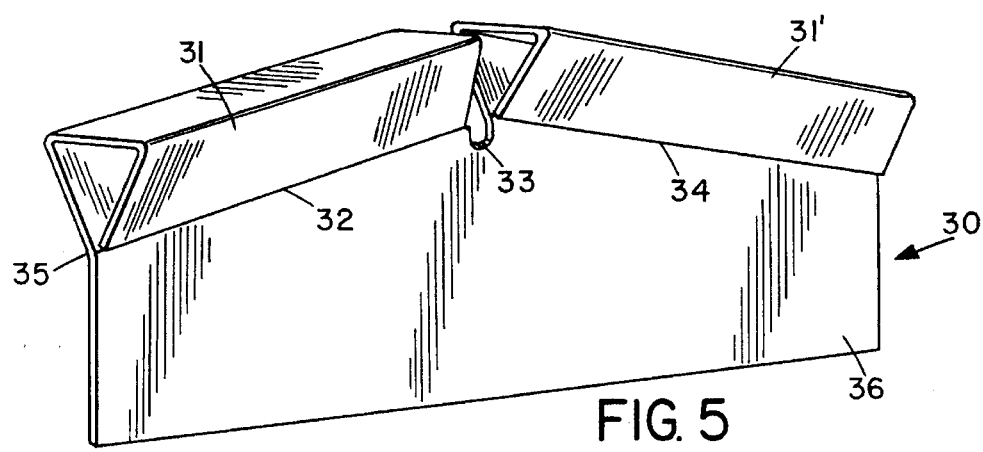
FIG. 5 is a perspective view of a second embodiment of the bracket.

A first type of brackets for connecting two or more beams together are formed in a procedure similar to that used for the beams. As illustrated in FIGS. 3 and 5, the brackets 20 and 30 are formed by bending a sheet of cold formed steel to form a triangle at at least one edge of the sheet. Describing bracket 20, the edges 22 and 24 of bracket are bent inward so that they end at the apex 26 or 27 of the triangle without forming a second wing as in the beams. The sheet is pre-cut so that the edges have the desired angles. In this illustration, the sheet steel would be trapezoidal in shape. The dimensions of the bracket's triangles are preferably slightly smaller than those of the beam so that they closely fit within the beam's triangle. Alternatively, the bracket's triangles may be larger than those of the beam, with the beam being inserted into the bracket. A single wing 25 extends between the two triangles 21 and 23, unlike the two wings created in formation of the beams. This allows the brackets to be formed from a single sheet with the fewest number of bends possible, making their manufacture simple and economical. No fastening of the bracket itself is required, the only fasteners being applied when the beams and brackets are assembled. The assembly of a bracket 20 with two beams 2 and 2' is illustrated in FIG. 4. Fasteners 40 are shown as sheet metal screws, but may also be welds, rivets or bolts. The brackets may be pre-drilled with holes to facilitate assembly.

Figure 6:
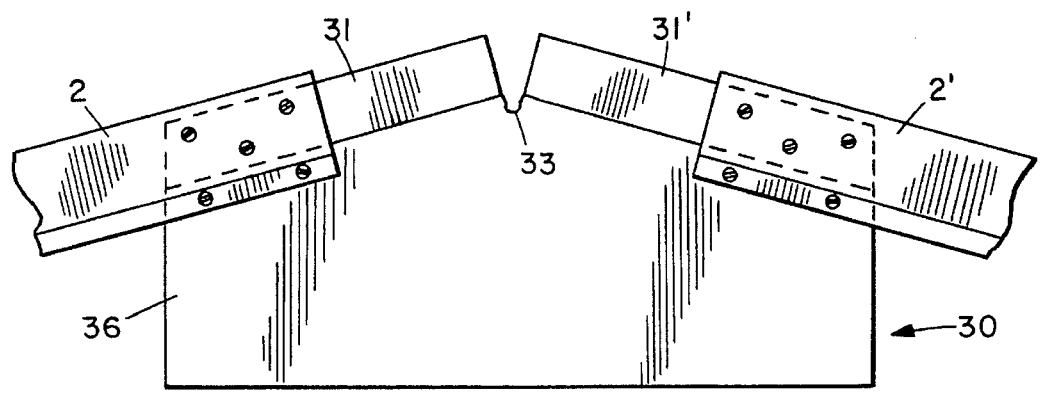
FIG. 6 is a side view of the bracket of FIG. 5 joining two beams.

Illustrated in FIG. 5 is a bracket 30 for forming the peak in a roof or similar angled construction by attaching two beams 2 and 2'. While the angle shown is relatively large, the bracket 30 can be formed to provide virtually any angle required. As described above for bracket 20, the sheet of cold formed steel is pre-cut to the desired angle, in this case forming a hexagon. A notch 33 is made at the apex 35 to allow the triangles to be formed independently of each other. The triangles 31 and 31' are formed by creating three folds parallel to the angle-cut edges 32 and 34, with the edges at the apex 35. The triangles 31 and 31' have sides slightly smaller than the inner dimensions of the triangle of a beam. Alternatively, the dimensions of the triangles 31 and 31' can be larger than the outer dimensions of the beams so that the bracket is fitted over the outside of the end of the beam to be joined. The bracket 30 and beams 2 and 2' are attached as shown in FIG. 6, with fasteners being driven through the wings of the respective beams and through single wing 36 of the bracket. Alternatively, as with other connections, the pieces may be welded together. Holes may be pre-drilled for the desired fasteners.

Figure 7:
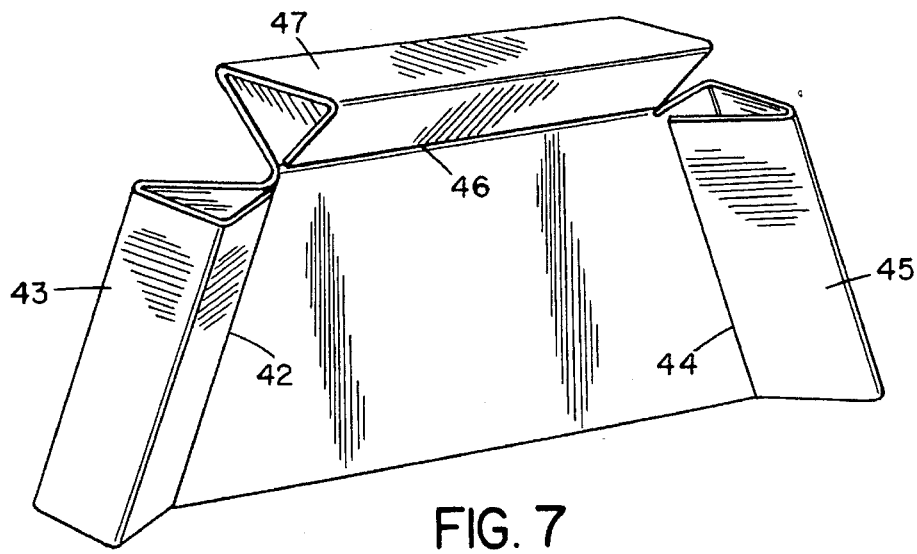
FIG. 7 is a perspective view of a bracket for joining three beams.

Three beams may be joined together using a bracket of the configuration shown in FIG. 7. Edges 42 and 44 of the sheet metal are cut at the desired angles, then folded inward to form triangles 43 and 45. Edge 46 is also folded inward to form triangle 47. As with bracket 30, notches are cut between the individual triangles. The ends of the beams to be joined are slid over the appropriate triangle and fastened as above. The angles may be varied as needed by pre-cutting the sheet metal.

Figure 8:
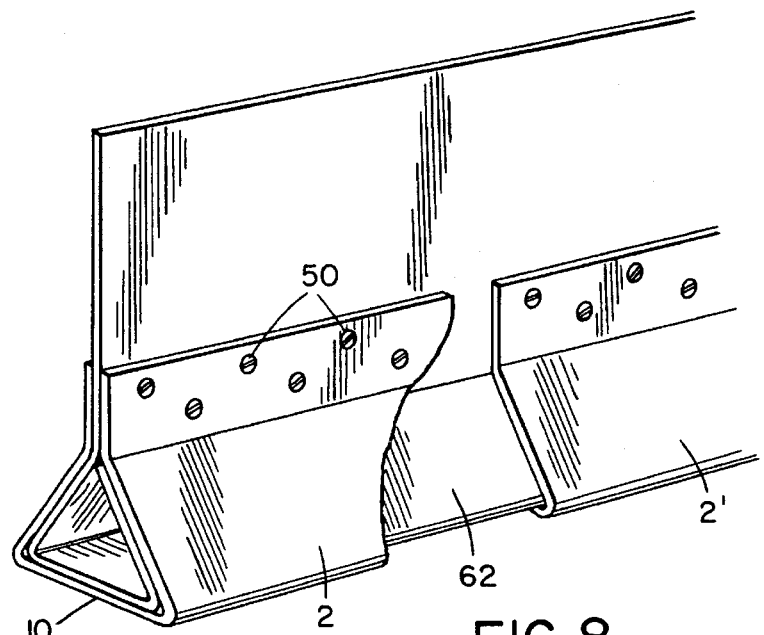
FIG. 8 is a perspective view, partially cut away, of a bracket joining two beams end-to-end.

Two beams may be attached together end-to-end by either inserting a telescoping-type connector bracket into the ends of each beam 2 and 2' or inserting the ends of the beams into the telescoping connector. A connection of the former type is shown in FIG. 8. The telescoping connector bracket 62 consists of a triangular tube formed by bending a single piece of sheet steel along three longitudinal lines into dimensions that are slightly smaller than the interior dimensions of the beam triangle 10. Alternatively, the dimensions of the triangular tube can be larger than the outer dimensions of the beam triangle 10 so that the bracket is fitted over the ends of the beams to be joined. The bracket 62 should fit closely within the triangle 10 to provide optimal support. Fasteners 50 or welds are then used to attach each beam 2 and 2' to the connector 62. As illustrated, the fasteners are driven through the respective wings of the connector and beams. Where the ends of the beams are inserted into the telescoping connector, the triangle of the connector has dimensions slightly larger than the outer dimensions of the beams.

Figure 9:
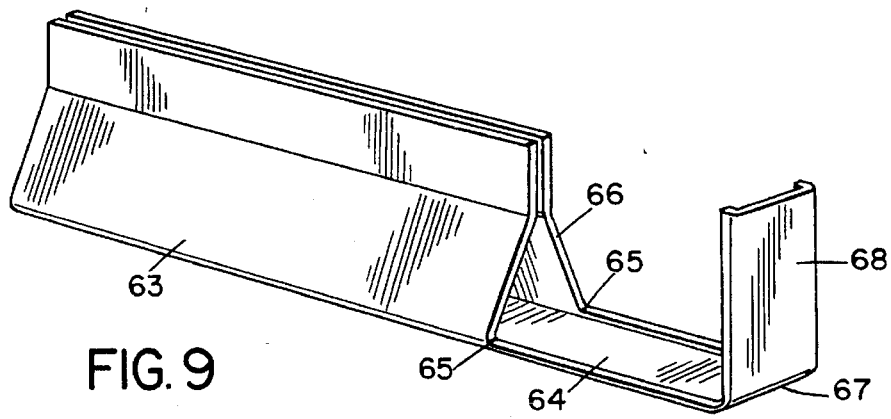
FIG. 9 is a perspective view of beam section for attachment to a wood stud.

The connector or end joint illustrated in FIG. 9 provides a means for directly attaching a beam to a wood stud (or other construction material). The triangular portion 63 can be either a beam itself, or a connector which telescopes with a beam, similar to the embodiment of FIG. 8. In either case, the triangular portion 63 is formed in the same manner as the beam of FIG. 2. Near the end of the beam, a section of the triangle is cut away by making a lengthwise cut along each of the lower corners 65 of the triangle, leaving only the base of the triangle. This creates an extension 64 which is generally flat (except for curvature at the edges 66 corresponding to the lower corners of the triangle). For a 2×4 stud, the end of extension 64 is bent upward to create a space of 2 inches between the location of the cut 66 and the upwardly bent end 68. The 2×4 stud is then fitted within the space, and fasteners such as nails or wood screws are used to attach the beam to the stud. The extension 64 provides additional support and stability for a composite structure made of beams and other construction material, such as, in this example, wood studs. The space may be adapted to fit any construction material by adjusting the location of the cut 66 and the bend 67.

An alternative embodiment of the end joint of FIG. 9 is illustrated in FIG. 10. This embodiment differs from that of FIG. 9 in that the triangular portion 72 is formed after the extensions are defined. A flat sheet of stainless steel is cut with two end sections 73 and 74 width L1 and a center of width L2 which equals L1 plus the outer width of the triangular portion 72 (shown unfolded by the dashed lines).

A lengthwise cut is made in from the ends along a line that will be the first corner 75 of the triangular section 72, leaving extension 76 and 77 with width L3. The metal sheet is then folded lengthwise to create corner 75. The center portion is folded lengthwise again to form corner 78 and bent at line 79 to form a lip 80. End tabs 81 and 82 are folded inward, against the ends of triangular section 72 to provide additional strength and to provide means for attachment to one side of a 2×4 stud or other construction materials. As an example, tab 82 is shown with wood screws through it for attachment to stud 84 (shown in dashed lines). Stud 84 fits within a space between tab 82 and extension end 86, which is bent upward to be parallel to tab 82. Fasteners may be driven through the outside of end 86 into stud 84. (As in other components, holes may be pre-drilled in the metal to facilitate assembly.) Extension 76 is shown without an upwardly bent end. In this configuration, attachment to a wood stud (not shown) can be accomplished by driving fasteners upwardly through extension 76 and outwardly through tab 81. By not bending up the end, connection can be made to a large beam or other large dimension structure, e.g., the edge of a concrete block. The combination of tab 81 and extension 76 can also be bent to create a curved contact surface for attachment to pipes or other rounded surfaces. An end joint configured as that shown in FIG. 10 retains the advantages of high strength and simple manufacture of the triangular beam while providing versatility for adaptation to other building surfaces.

The bracket 90, illustrated in FIG. 11, is formed from a strip of sheet steel and may be of any length for use in connecting two neighboring beams. At each end of bracket 90, the metal is bent laterally to conform to the outer shape and dimensions of the beams to be joined. Here, both beams 92 and 94 are oriented in the same direction, with bases 96 and 97 facing downward. The ends of bracket 90 are bent to conform with the sides of the beams 92 and 93 and then bent downward at the center to wrap around the wings 98 and 99 of the beams. Fasteners, here, machine screws 100, are driven through the bracket and wings of each beam. It is possible to join a string of beams by continuing the extension 93 of bracket 90 for whatever length is needed, bending the bracket to conform to the upper profiles of the beams for each beam to be joined. For example, if a third beam were to be attached between beams 92 and 94, three lateral bends would be made in the center of extension 90 to conform to the wings and sides of the third beam.

Bracket 102, illustrated in FIG. 12, is used to join two beams which have their wings 104 pointed toward each other (only one beam is shown). Similar to previous brackets, bracket 102 is formed by making lateral bends in a strip of sheet steel. Each of the ends 106 and 107 of bracket 102 wrap around the side 108 and base 109 of the beam 103 with a lip 110 extending partially up side 111, so that each end 106 and 107 will cradle the beam. A fastener 112, here, a sheet metal screw, may be driven through the bracket 102 and wings 104 to secure their relative positions. The extension 105 between the two triangular sections may be whatever length is needed to span the two beams.

Figure 13:
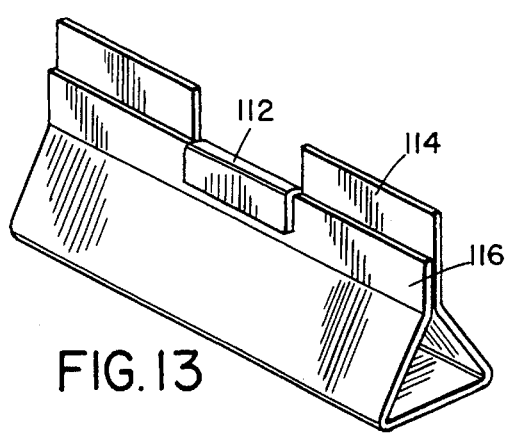
FIG. 13 is a perspective view of a beam modified to provide additional support.

In FIG. 13 a means of reinforcing a lengthy beam is illustrated. When a beam is several meters long without support or some connection at its center, forces on the ends of the beam may cause the beam to gape at the center. This gaping can be alleviated by cutting a section 112 in one wing 114 and folding to over the other wing 116, thereby providing means for holding the wings together without requiring additional fasteners. As illustrated in FIG. 13, wing 114 is longer than wing 116 to facilitate this reinforcement procedure. Alternatively, a notch can be made in wing 116 to allow section 112 to be folded over when wings 114 and 116 are the same length.

Another means for reinforcing a lengthy beam is illustrated in FIGS. 22 and 23. A generally U-shaped cut 204 is made through both wings 200 and 201 of the beam to form a tongue 202. The tongues 202 from each wing are pressed together through both cut-outs and bent back around the outer side of the wing, as shown in FIG. 23. Alternatively, the inner tongue (as illustrated, the tongue on the right wing) can be cut off and the remaining tongue bent across as shown. The shape of the cut-out is not limited to a U-shape, but can be any cut which creates a tongue-like protrusion in one wing which may be bent through the cut-out in the adjacent wing to hold the two wings together.

A third means for longitudinally reinforcing the beam is shown in FIG. 24. Here, grooves 210 are formed in the sides 212 and base 214 of the triangle to provide additional strength against bending or gaping. By pressing or bending the metal surfaces. For ease of manufacture, the grooves are formed before the triangle itself is created. This way, large sheets of corrugated metal can be formed, then cut as needed to make the triangular beams.

Figure 14:
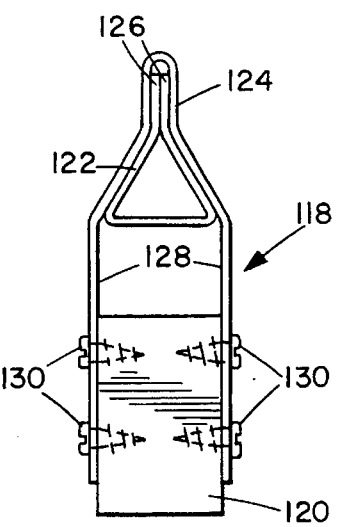
FIG. 14 is a side elevation of a bracket for suspending a stud from a beam.

FIG. 14 illustrates a bracket 118 for suspending a wood stud 120, or other type construction material, including other beams, from a beam 122. Bracket 118 is a strip of sheet steel which is bent laterally five times to form a generally triangular cross-section at its upper portion, including an open slot 124 into which the wings 126 of beam 122 fit. The two extensions 128 of bracket 122 can be as long or as short as needed to permit proper spacing between the stud 120 and beam 122. Screws 130, or other fastening means are used to fix the stud 120 within the bracket 118. Stud 120 need not actually be suspended from beam 122, but can merely be supported at its upper end by the beam 122 and bracket 118.

Figure 15:
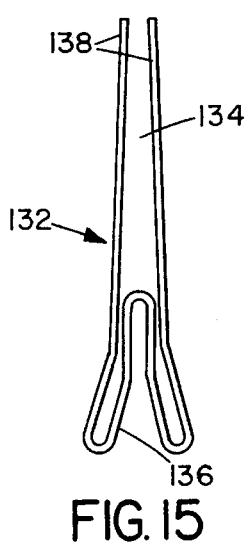
FIG. 15 is an end elevation of a bracket for supporting construction material above a beam.

The bracket 132 shown in FIG. 15 is used for attaching construction materials (not shown) within space 134 to a beam (not shown), the top of which fits within generally triangular section 136, similar to the relationship between the beam and connector shown in FIG. 14. Bracket 132 is formed in the same general manner as other brackets. Space 134 may be expanded to accept a wood stud or other materials, a fastener (not shown) may be driven through extensions 138 to affix the material to the connector 132, similar to that shown in FIG. 14.

Figure 16:
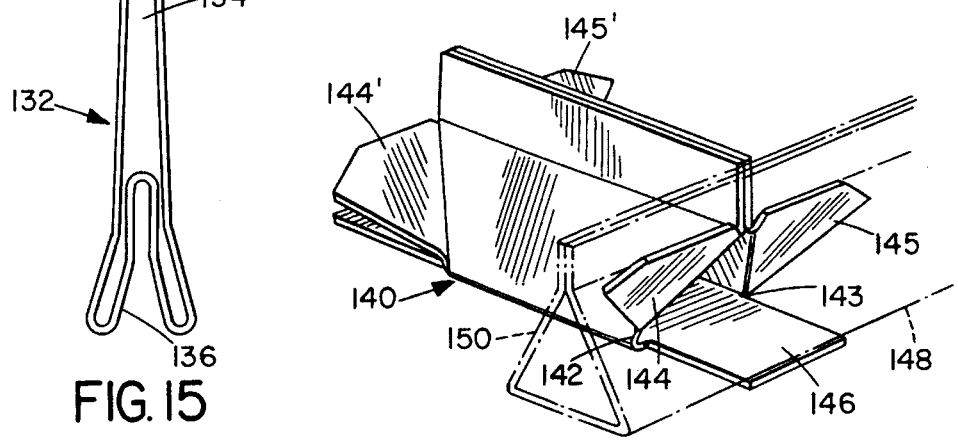
FIG. 16 is a perspective view of a connector for joining two beams in a parallel arrangement.

The end joint 140 illustrated in FIG. 16 may be a separate connecting piece or may be a modified end of a full beam which allows one beam to be directly attached perpendicular to a second beam. Here, it is shown as a separate connecting piece. End joint 14 is of the same construction as is the basic beam (as in FIG. 2). Lengthwise cuts are made along the lower corners 142, 143 of the triangle and the wing portions above the triangle are removed. The side flaps 144, 145 are bent away from the extended base 146 at the same angle as the side of a beam. Here, beam 148, shown in dotted lines, illustrates the relationship between the bent-back side flaps and the side of the beam to which the end joint 140 attaches. Extended base 146 supports the bottom (base) of beam 148, while the side flaps 144 and 145 contact the side 150 of the beam 148. Fasteners (not shown) may be driven through the base 146 and the side flaps 144 and 145 into beam 148 to firmly attach the end joint 140 perpendicular to the side of the beam 148. At the opposite end of the end joint 140, no beam is shown, but the flaps 144' and 145' and base extension 146 are ready to be attached to another beam which will then be parallel to beam 148.

Figure 17:
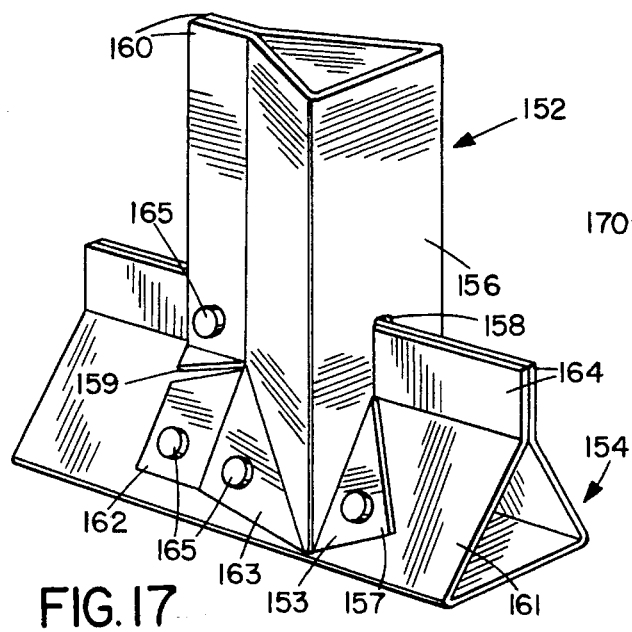
FIG. 17 is a perspective view of a first joint for joining one beam to another in a perpendicular arrangement.

The end joint shown in FIG. 17 may be formed either in a separate connector or at the end of a beam. Here, the joint is shown formed at the end of beam 152 which is to be attached perpendicular to beam 154. To form the joint, a basic beam is cut with a lengthwise cut 158 into the centor of the base 156 for a distance approximately equal to the height of beam 154. Adjacent the lower part of the cut, the corners 157 are bent away from the base 156 to create a triangular opening corresponding to the cross-section of beam 154, with flaps 153 abutting sides 161 of beam 154.

A second cut 159 is made laterally across both wings 160 and the lower corners 162 are bent outward to create a triangular opening corresponding to the cross-section of beam 154 with flaps 163 abutting sides 161 of beam 154. The beam 152 is fitted down over beam 154 making sure that the wings 164 are fully seated within cut 158. Fasteners 165 may be driven through the flaps 153 and 163 and into sides 161.

Figure 18:
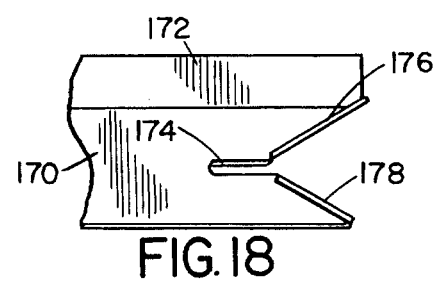
FIG. 18 is a side elevation of a second joint for joining one beam to another in a perpendicular arrangement.
Figure 19:
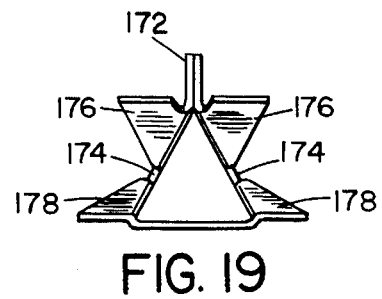
FIG. 19 is an end view of the second joint.

FIGS. 18 and 19 illustrate an alternate joint for attaching the end of one beam to the top of another. This joint differs from that of FIG. 17 in that the wings of the two beams do not meet. Instead, the wings of the beam to which the beam 170 is to be joined are inserted into slots 174. Slots 174 are formed by cutting lengthwise in from the beam end into sides 170 and bending the corners of the slots 174 back to create flaps 176 and 178. The flaps 176 and 178 are bent back to create a triangular opening with dimensions corresponding to the triangular cross-section of a basic beam, such as shown in FIG. 2. Once the joint is fitted over the beam to which beam 170 is to be attached, fasteners (not shown) may be driven through flaps 176 and 178 into the sides of the adjoining beam to provide a strong connection between the beams.

FIGS. 20 and 21 show a support brace 180 which may be used to add strength to a structure which has extended lengths of beams. Brace 180 is a strip of metal with L-shaped ends 182 which wrap around the beams 184 and 186 and are fastened to each of the beams, generally located about half between the ends of the beams. FIG. 20 illustrates a section of frame in which the inventive beams provide the vertically running portions (beams 184 and 186) attached to a 2×4 wood stud 188 at the base by the end joint 192, as in FIG. 9. At the tops of the beams is attached a third metal beam 190, which is attached using the end joint 194 as in FIG. 17.

In the preferred embodiments, the width of the base of triangle 10 of a beam is comparable to that of a two-by-four stud, so that anything that would have required support from the edge of a stud, such as wallboard, plywood or roofing material, will be similarly supported by the beam 2. Similarly, where specialized connectors are described above for use with wood studs, the inventive beams may be substituted for the stud. Nails or other fasteners may be driven through any side of the triangle 3 to attach material which is to be supported. Other building materials may also be inserted between the wings 4 and 6 and into a beam. For example, a two-by-four stud can be inserted by spreading the triangle to provide a wood surface for nails. Similarly, plastics or composite building materials may also inserted into the beams. Where appropriate, different size beams can be used which are larger than or smaller than the dimensions of a typical 2×4.

The combination of beams illustrated in FIG. 25 is an alternative to a 2×4 wood stud (or other standard wood construction beam), possessing the features that will allow other construction materials to be directly attached. This "metal 2×4" is formed from two asymmetrically bent triangular beams 220 and 222 which have legs 221 and 223 extending from the apexes to form a flat surface 226 comparable to the 2 inch edges of a 2×4 wood stud into which fasteners may be driven to support other construction materials. The two beams 220 and 222 are joined together by a generally channel-like connector 228 which is attached to the inside wing 230 of each beam by welding or some other fastening means (welds are shown but not labeled). For attachment of construction materials to the broader side of the beam, fasteners may be driven through the bases 232 and 234 of the two triangles. As an example of the use of this "metal 2×4", it may be used to replace the wood stud 84 illustrated in FIG. 10. Leg 221 of the "metal 2×4" would be attached by fasteners to extension 77, and screw can be driven through end tab 82 into base 232.

The material of which the beams and various brackets are made can be adapted to fit the demands of the construction project. Cold formed steel ranging from 24 gauge to 8 gauge can be used, as well as other metals such as aluminum, titanium and numerous steel alloys. For most common construction purposes, steel will likely be the material of choice.

The brackets described above permit the formation of virtually any angle required for building a structure without requiring angle cuts to be made in the ends of the beams. This is of particular importance where the training level of the construction personnel is such that angle cuts are a frequent source of errors.

The inventive beams, brackets and assembly method can be substituted for traditional two-by-four framing studs, door and window headers, and any number of other applications for which wood framing is traditionally used. Actual I-beams can be formed by joining two beams together along their entire length using a long gusset, allowing the inventive system to be used as a substitute for traditional metal framing as well. The lightweight steel beam system is inexpensive to manufacture and is as easy to assemble and handle as traditional wood construction. The use of steel beams as an alternative to wood addresses an issue that has had significant impact on the construction industry, providing a high quality, environmentally safe material. Further, the steel beams are immune to many of the problems of wood construction, since insect damage and wood rot are not of concern.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A lightweight metal frame and truss system comprising:

a plurality of beams, each beam comprising a single piece of sheet metal bent lengthwise along four parallel lines to form a triangular cross-section having a base and two sides and two wings, one wing corresponding to each side, extending from an apex of said triangular cross-section and having a wing height less than a side length of said each side, said beam having a beam length, an inner beam surface and an outer beam surface and being openable between said two wings, each of said inner beam surface and said outer beam surface having five planar segments defined by said base, said two sides and said two wings;

a plurality of end joints, each end joint comprising a single piece of sheet metal formed at an end of a first beam of said plurality of beams with at least one lengthwise cut therein to create a joint opening conforming to at least two planar segments of an outer surface of a first construction material so that said at least two planar segments of said outer surface of said construction material are contained within said joint opening to create a first connection point having a width much less than a length of said construction material;

a plurality of brackets for connecting at least one of said beams to a second construction material, each bracket comprising a strip of sheet metal having at least one lateral bend therein to conform said strip to at least two planar segments of said outer beam surface and at least one extension for abutting said at least two planar segments of said outer surface of said construction material to create a second connection point having a second length much less than said beam length;

a plurality of gussets, each gusset comprising a flat piece of sheet metal having a plurality of edges and a third length much less than said beam length, at least one lengthwise edge being inserted between said two wings of said beam to create a third connection point with at least two planar segments of said inner beam surface and having said third length; and a plurality of fastening means for fastening said end joints, said brackets and said gussets to said construction material and to said beams;

wherein said beam and said construction material are attached together at said first, second and third connection points so that a space exists between said beam and said construction material except at one of said first, second and third connection points.

2. A lightweight metal frame and truss system as in claim 1 further comprising a plurality of triangular telescoping connectors, each triangular telescoping connector for joining two beams of said plurality of beams end to end.

3. A lightweight metal construction system as in claim 2 wherein said triangular telescoping connector is bent at an angle.

4. A lightweight metal construction system as in claim 1 wherein said first construction material is a second beam of said plurality of beams and said end joint comprises a lengthwise cut in said base with said two sides and said two wings bent outward from said apex to conform to said first portion of said outer surface wherein said first portion comprises said two sides of said triangular cross-section and their corresponding two wings of said second beam.

5. A lightweight metal construction system as in claim 1 wherein said first construction material is a second beam of said plurality of beams and said end joint comprises a lengthwise cut along each corner between said base and said two sides with said two sides bent outward from said apex to conform to said first portion of said outer surface wherein said first portion comprises said base and one of said two sides of said second beam.

6. A lightweight metal construction system as in claim 1 wherein said first construction material is a second beam and said end joint comprises a lengthwise cut in each of said two sides with said two sides bent and away from said lengthwise cut to conform to said first portion of said outer surface wherein said first portion comprises said two sides and their corresponding two wings of said second beam.

7. A lightweight metal construction system as in claim 1 wherein said first construction material comprises a wood stud and said end joint comprises a lengthwise cut along each corner between said base and said two sides and a lateral cut across said two sides and said two wings to remove a section of each side and their corresponding two wings of said second beam.

8. A lightweight metal construction system as in claim 1 wherein said first construction material comprises a metal 2×4 formed by joining a pair of asymmetrically-formed beams with a channel-like connector and said end joint comprises a lengthwise cut along each corner between said base and said two sides and a lateral cut across said two sides and said two wings to remove a section of each side and their corresponding two wings of said second beam.

9. A lightweight metal construction system as in claim 7 wherein said base is bent laterally at a 90° angle at a distance from said lateral cut corresponding to a width of said wood stud.

10. A lightweight metal construction system as in claim 1 wherein a bracket of said plurality has one lateral bend at each end of said strip.

11. A lightweight metal construction system as in claim 1 wherein a bracket of said plurality has three lateral bends to conform said strip to said portion of said outer surface of said triangular cross-section and its corresponding two wings.

12. A lightweight metal construction system as in claim 11 wherein said bracket further has two elongated extensions having a spacing therebetween to span a width of said second construction material.

13. A lightweight metal construction system as in claim 1 further comprising a reinforcement means for extensive lengths of said beams, said reinforcement means comprising a pair of lateral cuts across one of said wings to form a wing segment with said wing segment being bent across the other of said wings.

14. A lightweight metal construction system as in claim 1 further comprising a reinforcement means for extensive lengths of said beams, said reinforcement means comprising a pair of generally U-shaped cuts in each of said wings to form a tongue in one of said wings which is pushed through the generally U-shaped cut in the other of said wings and bent across an outer surface of the other of said wings.

15. A lightweight metal construction system as in claim 1 further comprising a reinforcement means for extensive lengths of said beams, said reinforcement means comprising a plurality of lengthwise grooves formed in a base and sides of said triangular cross-section.

* * * * *